US008959182B1

(12) United States Patent
Anderson et al.

(10) Patent No.: US 8,959,182 B1
(45) Date of Patent: Feb. 17, 2015

(54) SYSTEMS AND METHODS FOR COMPUTER DATA RECOVERY AND DESTRUCTION (75) Inventors: Devin D. Anderson, West Jordan, UT (US); Steve Workman, Sandy, UT (US)

(73) Assignee: Crimson Corporation, Dover, DE (US)

( * ) Notice: Subject to any disclaimer, the term of this patent is extended or adjusted under 35 U.S.C. 154(b) by 764 days.

(21) Appl. No.: 12/103,437

(22) Filed: Apr. 15, 2008

(51) Int. Cl.
G06F 15/16 (2006.01)
(52) U.S. Cl.
USPC ............. 709/219; 709/217; 709/218; 726/26; 714/752
(58) Field of Classification Search
USPC ....................... 709/217–219; 726/26; 714/752
See application file for complete search history.

(56) References Cited

U.S. PATENT DOCUMENTS

| | | | |
|---|---|---|---|
| 6,701,455 B1 | 3/2004 | Yamamoto et al. | |
| 6,792,545 B2* | 9/2004 | McCreight et al. | 726/29 |
| 6,813,487 B1* | 11/2004 | Trommelen | 455/404.1 |
| 2001/0029591 A1* | 10/2001 | Takeda | 714/5 |
| 2002/0071421 A1* | 6/2002 | Chiu et al. | 370/349 |
| 2002/0121975 A1* | 9/2002 | Struble et al. | 340/571 |
| 2002/0174372 A1* | 11/2002 | Venkataraman | 713/400 |
| 2003/0018839 A1* | 1/2003 | Ishida | 710/71 |
| 2003/0208593 A1* | 11/2003 | Bharati et al. | 709/224 |
| 2004/0039889 A1* | 2/2004 | Elder et al. | 711/162 |
| 2004/0070499 A1* | 4/2004 | Sawinski | 340/568.1 |
| 2004/0252628 A1* | 12/2004 | Detzler | 369/288 |
| 2005/0125118 A1* | 6/2005 | Chalker et al. | 701/33 |
| 2005/0193248 A1* | 9/2005 | Idei et al. | 714/13 |
| 2005/0195755 A1* | 9/2005 | Senta et al. | 370/255 |
| 2006/0005074 A1* | 1/2006 | Yanai et al. | 714/5 |
| 2006/0031541 A1* | 2/2006 | Koch et al. | 709/229 |
| 2006/0075263 A1* | 4/2006 | Taylor | 713/194 |
| 2006/0149991 A1* | 7/2006 | Guzman et al. | 714/2 |
| 2006/0154692 A1* | 7/2006 | Ikehara et al. | 455/556.2 |
| 2006/0189326 A1* | 8/2006 | Black et al. | 455/456.1 |
| 2007/0072620 A1* | 3/2007 | Levitan | 455/456.1 |
| 2007/0127770 A1* | 6/2007 | Tredoux | 382/100 |
| 2007/0255766 A1* | 11/2007 | Di Giglio et al. | 707/204 |
| 2008/0186162 A1* | 8/2008 | Rajan et al. | 340/539.13 |
| 2008/0237359 A1* | 10/2008 | Silverbrook et al. | 235/494 |
| 2008/0240420 A1* | 10/2008 | Oxford | 380/28 |
| 2008/0270629 A1* | 10/2008 | Yang et al. | 709/248 |
| 2009/0057400 A1* | 3/2009 | Silverbrook et al. | 235/380 |
| 2009/0260088 A1* | 10/2009 | Quach | 726/26 |
| 2009/0292966 A1* | 11/2009 | Liva et al. | 714/752 |

FOREIGN PATENT DOCUMENTS

JP         2002325280 A  * 11/2002 ............... H04Q 7/38

OTHER PUBLICATIONS

"De Beers Canada turns to Absolute Software for Diamond-Tough notebook security," http://www.absolute.com/resources/corporate-resources-case-studies.asp?CSID=debeers, Apr. 14, 2008.

* cited by examiner

*Primary Examiner* — Razu Miah
(74) *Attorney, Agent, or Firm* — Austin Rapp & Hardman (57) ABSTRACT

A method for data recovery and destruction is disclosed. The method includes determining whether a network connection has been established by a computer system. If the network connection has been established, it is determined whether a specified server is accessible via the network connection. If the specified server is accessible, the specified server is accessed to determine whether a data recovery and destruction flag has been set for the computer system. If the flag has been set, a data recovery and destruction procedure is initiated. The data recovery and destruction procedure may involve transferring data from the computer system to at least one other computer system and then destroying at least a portion of the transferred data on the computer system.

9 Claims, 9 Drawing Sheets

SYSTEMS AND METHODS FOR COMPUTER DATA RECOVERY AND DESTRUCTION

TECHNICAL FIELD

The present disclosure relates generally to computers and computer-related technology. More specifically, the present disclosure relates to systems and methods for computer data recovery and destruction.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. As is often the case, a single server or core server is responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible, which may include minimizing effects to existing computer systems and networks.

Further, computers on a managed network, including laptop computers, are increasingly utilized to store sensitive and confidential information. If a managed computer is stolen, the risk of disclosure of confidential or sensitive information is significant. Current systems for managing computer networks and for protecting sensitive information on a managed network or on computer systems have significant limitations.

As shown from the above discussion, there is a need for systems and methods that will improve the ability to manage and support computer systems and that will limit the disclosure of confidential information stored on a computer system or network. Improved systems and methods may enable a person performing computer support to work more efficiently and accomplish more in less time and to also limit the disclosure of confidential information stored on a computer system or network.

DETAILED DESCRIPTION

A method for data recovery and destruction is disclosed. The method may include determining whether a network connection has been established by a computer system. If the network connection has been established, it is then determined whether a specified server is accessible via the network connection. If the specified server is accessible, the specified server is accessed to determine whether a data recovery and destruction flag has been set for the computer system. If the flag has been set, a data recovery and destruction procedure is initiated. The data recovery and destruction procedure may include transferring data from the computer system to at least one other computing device and then destroying at least a portion of the transferred data on the computer system.

The computer system may be a portable computing device (e.g., a laptop computer) or a non-portable computing device (e.g., a desktop computer system or server). The at least one other computing device may include the specified server. The data recovery and destruction procedure may include the prioritized transfer of data to the at least one other computing device.

The specified server may be an administrative system for the computer system. The administrative system may run a management application that performs the data recovery and destruction procedure and at least one other management task with respect to the computer system.

The files to be deleted or recovered may be identified by searching the computer system during the data recovery and destruction procedure. In one embodiment, emergency data recovery and destruction procedures are implemented if electronic communication with the specified server is terminated during the data recovery and destruction procedure.

A computer system for data recovery and destruction is also disclosed. The system includes a processor, and memory in electronic communication with the processor. Instructions stored in the memory are executable to determine whether a network connection has been established by the computer system. If the network connection has been established, the instructions are also executable to determine whether a specified server is accessible via the network connection. If the specified server is accessible, the instructions are further executable to access the specified server to determine whether a data recovery and destruction flag has been set for the computer system. If the flag has been set, the instructions are executable to initiate a data recovery and destruction procedure. The data recovery and destruction procedure may include transferring data from the computer system to at least one other computing device and then destroying at least a portion of the transferred data on the computer system.

A computer-readable medium comprising executable instructions for data recovery and destruction is also described. The instructions may be executable to determine whether a network connection has been established by a computer system. If the network connection has been established, the instructions are also executable to determine whether a specified server is accessible via the network connection. If the specified server is accessible, the instructions are executable to access the specified server to determine whether a data recovery and destruction flag has been set for the computer system. If the flag has been set, the instructions are executable to initiate a data recovery and destruction procedure.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Figure 1:
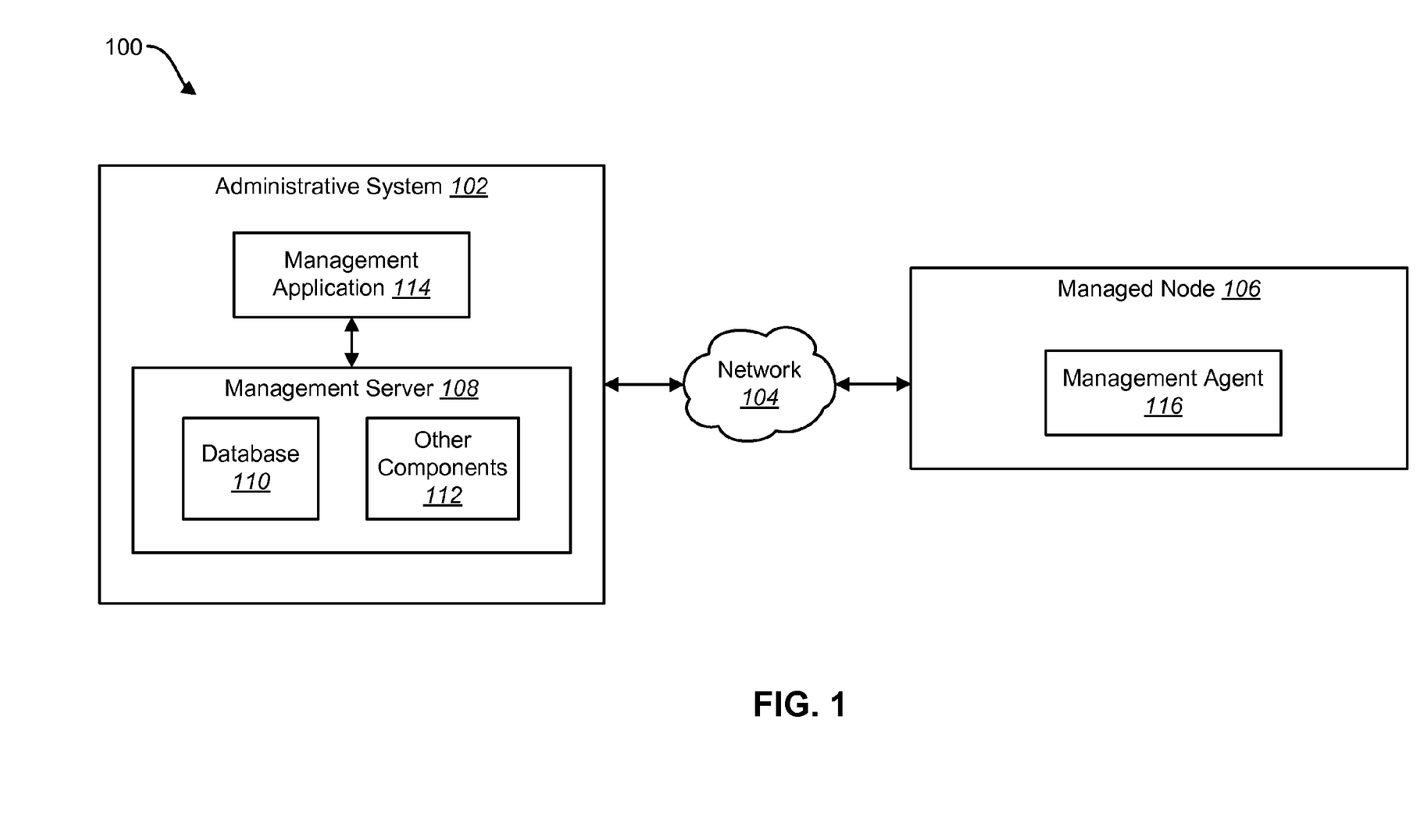
FIG. 1 is a block diagram that illustrates a managed network in which a system for recovery and destruction of computer data may be implemented.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes" or "nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 includes a database 110 of information. The management server 108 also includes various other components 112 that are configured to perform tasks such as scheduling, handling alerts, and so forth. An example of a management server that may be used with embodiments disclosed herein is the core server for the LANDesk® Management Suite.

The administrative system 102 also includes a management application 114. The management application 114 may be used to perform various tasks related to the management of the computer network 104, such as remote control features, software distribution, software license monitoring, operating system imaging and migration, IT asset management, problem resolution, and acting as a gateway to the Internet or other networks for managed nodes 106. As used herein, an administrative system 102 "manages" a managed node 106 when it performs one or more management tasks with respect to the managed node 106.

As part of performing these tasks, the management application 114 may connect to the management server 108 and query the management server 108 to obtain information. An example of a management application 114 that may be used is the console application for the LANDesk® Management Suite. Although a management server 108 is shown in the embodiment depicted in FIG. 1, not all embodiments require a management server 108.

To enable a user of the administrative system 102 to perform management tasks via the management application 114, the managed node 106 includes a management agent 116. The management agent 116 performs management-related tasks in response to requests from the management application 114. An example of a management agent 116 that may be used is the LANDesk® Management Agent.

As indicated, the embodiment shown in FIG. 1 is merely illustrative. As shown, the system 100 includes only one managed node 106. Of course, the system 100 may include many managed nodes 106, networks 104, and subnets (e.g., a portion of an Internet protocol (IP) network defined by a subnet mask).

Figure 2:
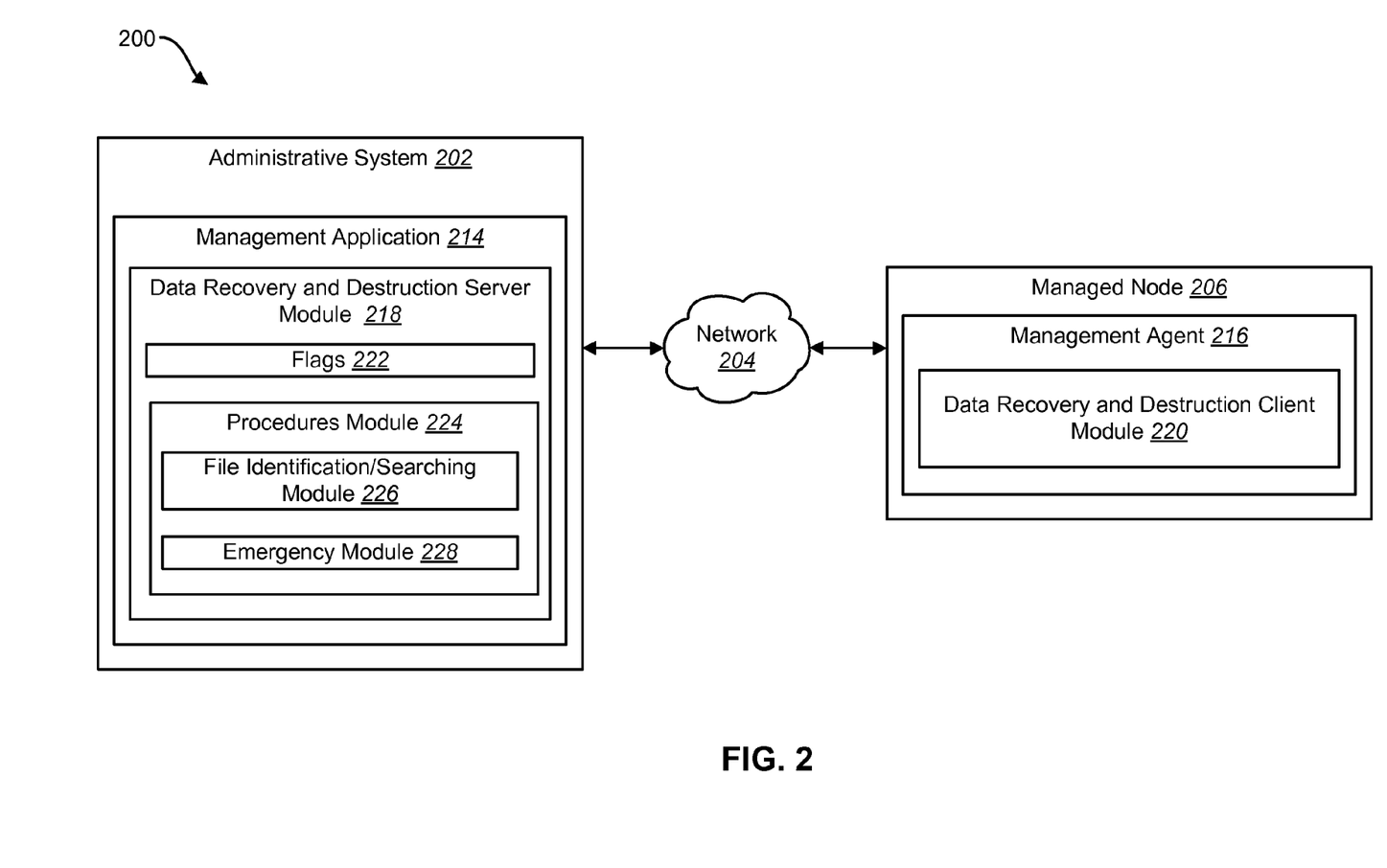
FIG. 2 is a block diagram illustrating one embodiment of a system for recovery and destruction of computer data.

FIG. 2 is a block diagram illustrating a system 200 for data recovery and destruction. As illustrated in FIG. 2, the system includes an administrative system 202, a network 204, and a managed node 206.

In the embodiment shown in FIG. 2, a data recovery and destruction server module 218 comprises a portion of a management application 214 running on the administrative system 202. Of course, the data recovery and destruction server module 218 may comprise a portion of the management server 108 (shown in FIG. 1) and may have portions of its code and functionality within the management application 214, the management server 108, and other applications. In addition, a data recovery and destruction client module 220 may be part of or may work with a portion of the management agent 216 of the managed node 206.

The administrative system 202, shown in FIG. 2, is a server that manages the managed node 206. The administrative system 202 provides various services for the managed nodes 206, such as software distribution, software license monitoring, operating system imaging and migration. Management tasks may be performed by the administrative system 202 either in an automated manner without human intervention, via a human administrator, or using a combination of both.

The client and server modules work 220, 218 together to both recover and/or destroy data on the managed node 206 if the managed node 206 is, for example, stolen. The data recovery and destruction client and server modules 218, 220 are shown as portions of larger software components 214, 216. As will be explained in greater detail below, however, these modules 220, 218 may comprise independent and discrete applications or may comprise subparts or modules of a single or multiple larger applications.

In the embodiment shown in FIG. 2, the server module 218 includes flags 222 and a procedures module 224. The flags 222 comprise any type of data indicating whether a request for destruction and recovery of data for a particular managed node 206 has been made. If a flag 222 has been "set," a request for data recovery or destruction has been made for a particular managed node 206.

The procedures module 224 controls the timing and sequence data recovery and destruction events once a flag 222 as been set. A file identification/searching module 226 indicates or determines which files or folders will be destroyed or recovered. For example, the procedures module 224, working in conjunction with the file identification/searching module 226, may indicate that certain types of files or files in a particular location on the managed node 206 are to be recovered during the recovery and destruction procedure. The procedures module 224 may also define whether destruction will occur if, for example, recovery of the specified files is not completed within a specified time frame. The procedures module 224 could also require that destruction will not occur until specified files have been recovered, if ever. The procedures module 224 may also indicate that each particular file or folder recovered will be destroyed on the managed node 206 as soon as it has been recovered or confirmed to be recovered.

The file identification/searching module 226 may initiate searching of the managed node 206 to identify particular files or folders at the time of the recovery or destruction. Alternatively, this module 226 could use a static list of files or folders to be recovered and/or destroyed.

The emergency module 228 identifies data recovery and destruction procedures to follow if the managed node 206 does not make contact with the administrative system 202 for a certain period of time or if electronic communication between the managed node 206 and the administrative system 202 is terminated during a data recovery and destruction procedure. For example, the emergency module 228 could require that no destruction occur until full recovery has taken place or, alternatively, could require that all of the specified data on the managed node 206 be destroyed immediately if the connection is terminated during the recovery and destruction procedures.

The client module 220 periodically determines whether the managed node 206 is connected to a particular network. If a network connection is found, the client module 220 will then determine whether a specified server, such as the administrative system 202, is accessible. If the administrative system 202 is accessible, the client module 220 will communicate with the server module 218 to determine whether a data recovery and destruction flag 222 has been set for the managed node 206. If it has been set, the client module 220 will initiate the specified recovery and destruction procedures.

The data recovery and destruction client module 220 could be installed on a managed node 206 before the managed node 206 is taken, misplaced, or stolen. However, in certain embodiments, this module 220 may be the installed remotely, such as using the management agent 216 via, for example, a connection to the Internet. In addition, if a static IP address has been assigned to the managed node 206, or another unique identifier, the data recovery and destruction client module 220 could be remotely installed even if the management agent 216 is not installed or running on the managed node 206.

Managed nodes 206 may include any type of portable computing device, such as a laptop computer, tablet PC, personal digital assistant (PDA), cellular telephone, Blackberry® device, or Apple® iPhone. Managed nodes may also include a desktop computer or other computing device that is generally not regarded as or intended to be mobile (a "non-portable" computing device).

Figure 3:
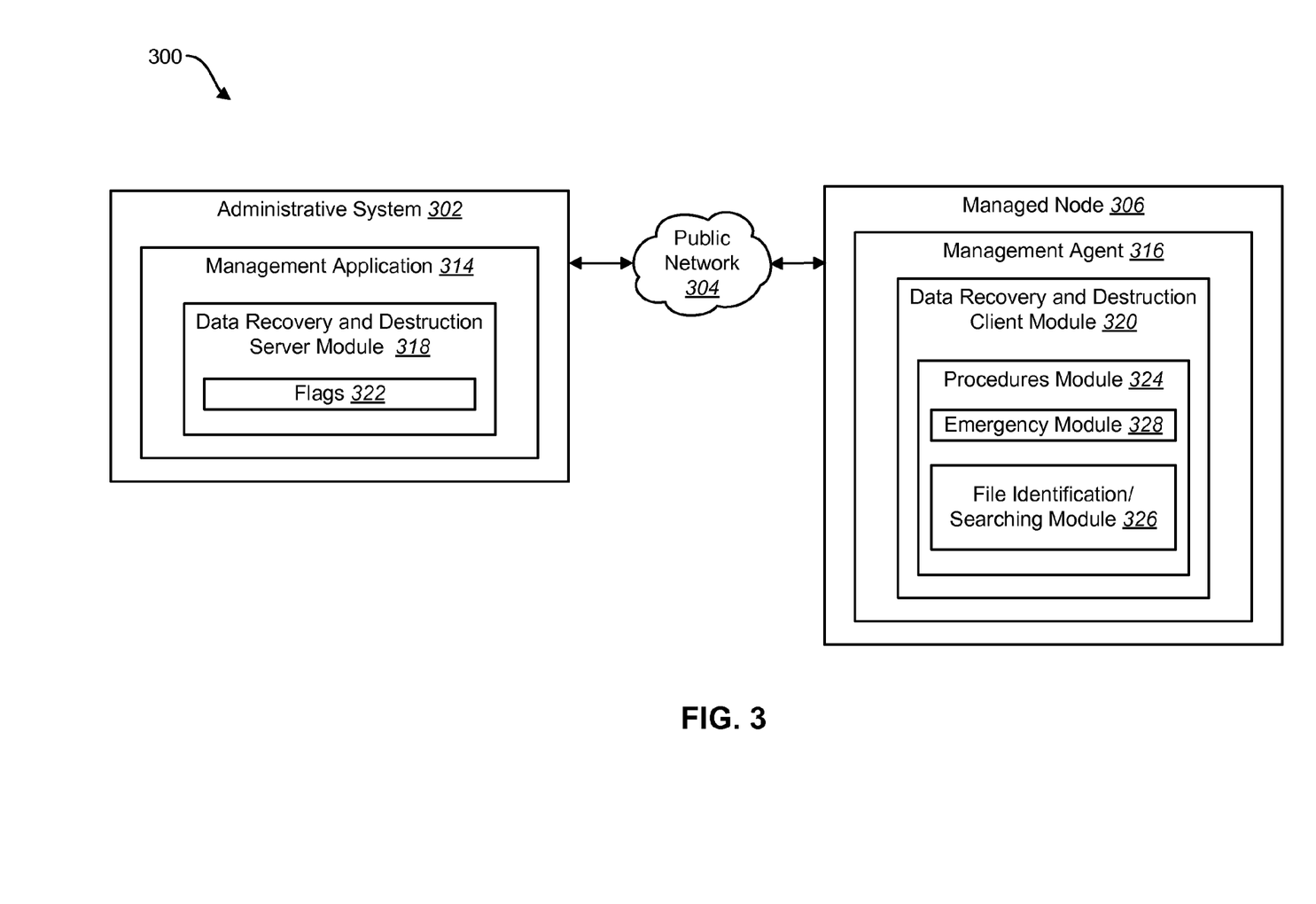
FIG. 3 is a block diagram illustrating yet another embodiment of a system for recovery and destruction of computer data, in which a procedures module is stored on a managed node.

With respect to FIG. 3, an alternative embodiment system 300 for data recovery and destruction is shown. This system 300 is similar to the system 200 shown in FIG. 2. However, the procedures module 324, including the file identification/searching and emergency modules 326, 328, comprise a portion of the data recovery and destruction client module 320, rather than a portion of the data recovery and destruction module server module 318. In this configuration, the procedures module 324 does not need to be transferred to the client module 320 because it is already present there, enabling the recovery and destruction procedures to be initiated more rapidly. Also, if the network connection is terminated, the recovery and destruction procedures may continue. In particular, destruction of files may continue and recovery may also continue to alternative computer systems, with which the managed node 306 may be in electronic communication, as will be explained in connection with FIG. 6.

As illustrated in FIG. 3, a public network 304, such as the Internet, may be utilized for electronic communicate between the administrative system 302 and the managed node 306. If, for example, the managed node 306 is a stolen laptop and is connected to the Internet by the thief, then electronic communication could be established with the administrative system 302 without the knowledge of the thief via the Internet.

In addition, it should be noted here that electronic communication between the administrative system 302 and the managed node 306 does not necessarily involve a public network 304. For example, a private local area network may be utilized to initiate the data recovery destruction procedures, as the theft could be internal to the company from which the laptop was taken. Also, internal company personnel may inadvertently utilize a laptop, or other computer system (each of which may comprise a managed node 306, not realizing that they are not authorized to access certain confidential information on that system. Thus, the systems and methods disclosed herein enable a company to limit dissemination of confidential information to unauthorized company personnel within the pertinent company.

In one embodiment, standard user input received at the managed node 306 will not affect data recovery and destruction procedures. For example, the data recovery and destruction client module 320 could be invisible to the end user or could be one of many system procedures without a standard user interface, i.e., and the user would have to identify and kill the particular process or disconnect the managed node 306 from a network 304 to terminate the recovery and destruction procedures. Further, in one embodiment, if it is determined that a user is attempting to interfere with or disable the client module 320 (e.g., by attempting to remove the data client module 320 from RAM, uninstall the client module 320, delete the client module 320 from the pertinent hard drive, or clean the hard drive), data recovery and destruction procedures could be initiated immediately. These implementations make it far less likely that an end user could successfully interfere with these procedures.

Figure 4:
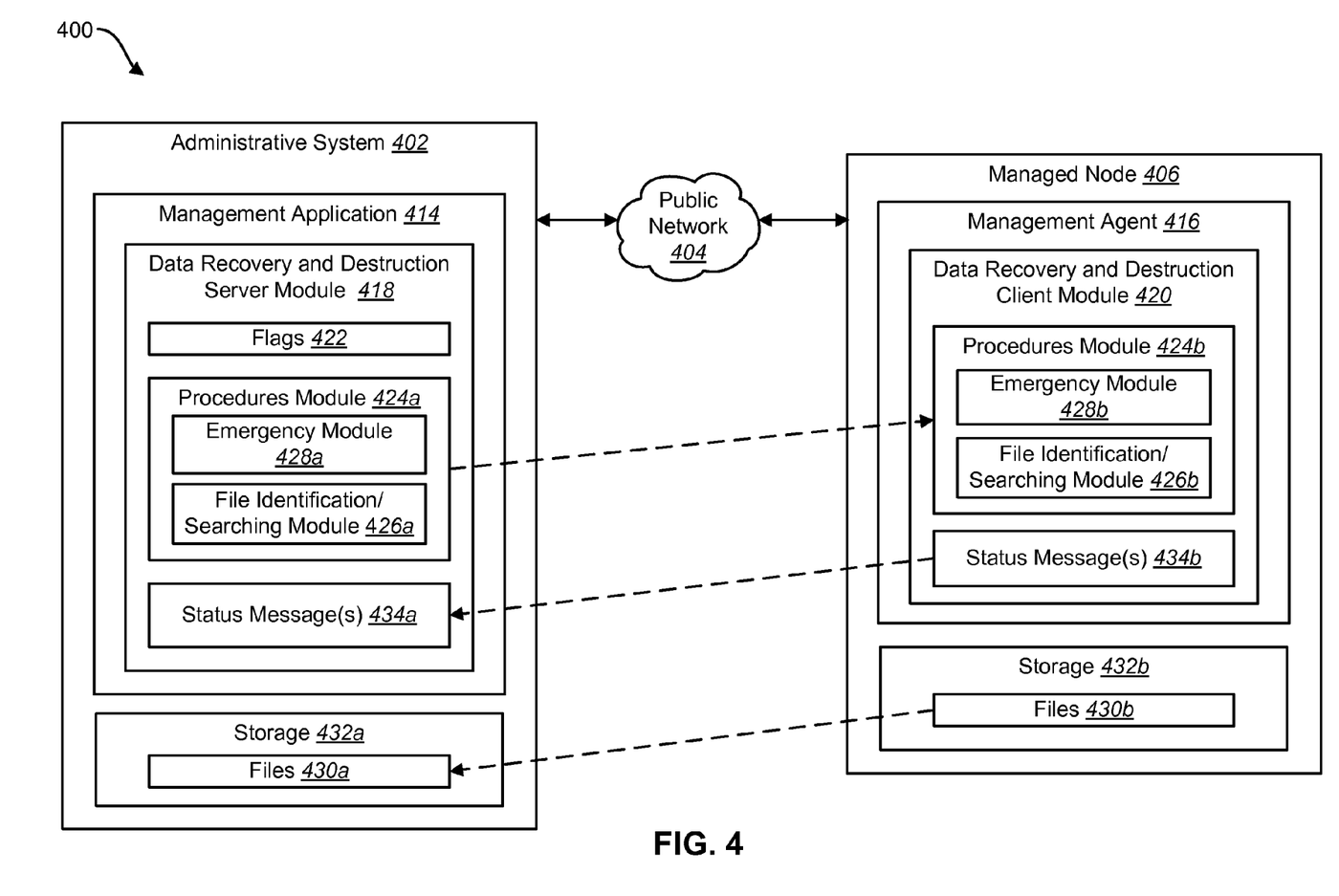
FIG. 4 is yet another embodiment of a system for recovery and destruction of computer data, in which a procedures module is stored both on an administrative system and on a managed node.

With reference to FIG. 4, yet another embodiment of a system 400 for data recovery and destruction is disclosed. In this embodiment, the data recovery and destruction procedures 424a-b are stored both on the server module 418 and on the client module 420. In this case, the procedures 424a are transferred from the administrative system 402 to the managed node 406 via a public network 404. Of course, the procedures module 424a-b or portions thereof may be stored on either one or both of the administrative system 402 and the managed node 406 within the scope of the disclosed systems and methods. In one embodiment, if the procedures 424a specified on the administrative system 402 are different than those 424b specified on the managed node 406, the procedures 424a-b could either be synchronized, the most recently generated procedures 424a-b could be utilized, or a protocol can be established for using either the procedures 424a on the administrative system 402 or the procedures 424b on the managed node 406. Flags 422 are also stored on the administrative system 402 to indicate whether recovery and destruction of data has been requested.

As shown in FIG. 4, pursuant to the data recovery and destruction procedures, files 430b are transferred from electronic storage 432b (e.g., RAM, a hard disk, or a solid state drive) on managed node 406 by the public network 404 to electronic storage 432a on or in communication with the administrative system 402. Transferring of files 430a-b, as suggested above, may be in addition to subsequent destruction of these files 430b on the managed node 406 or the files 430b may simply be transferred to the administrative system 402, leaving them on the managed node 406.

Also, periodic status messages 434b may be transmitted from the managed node 406 to the administrative system 402 indicating the status of the data recovery and destruction procedures. In one embodiment, a status message 434a-b is transmitted to the administrative system 402 only at the completion of the data recovery and destruction procedures.

Figure 5:
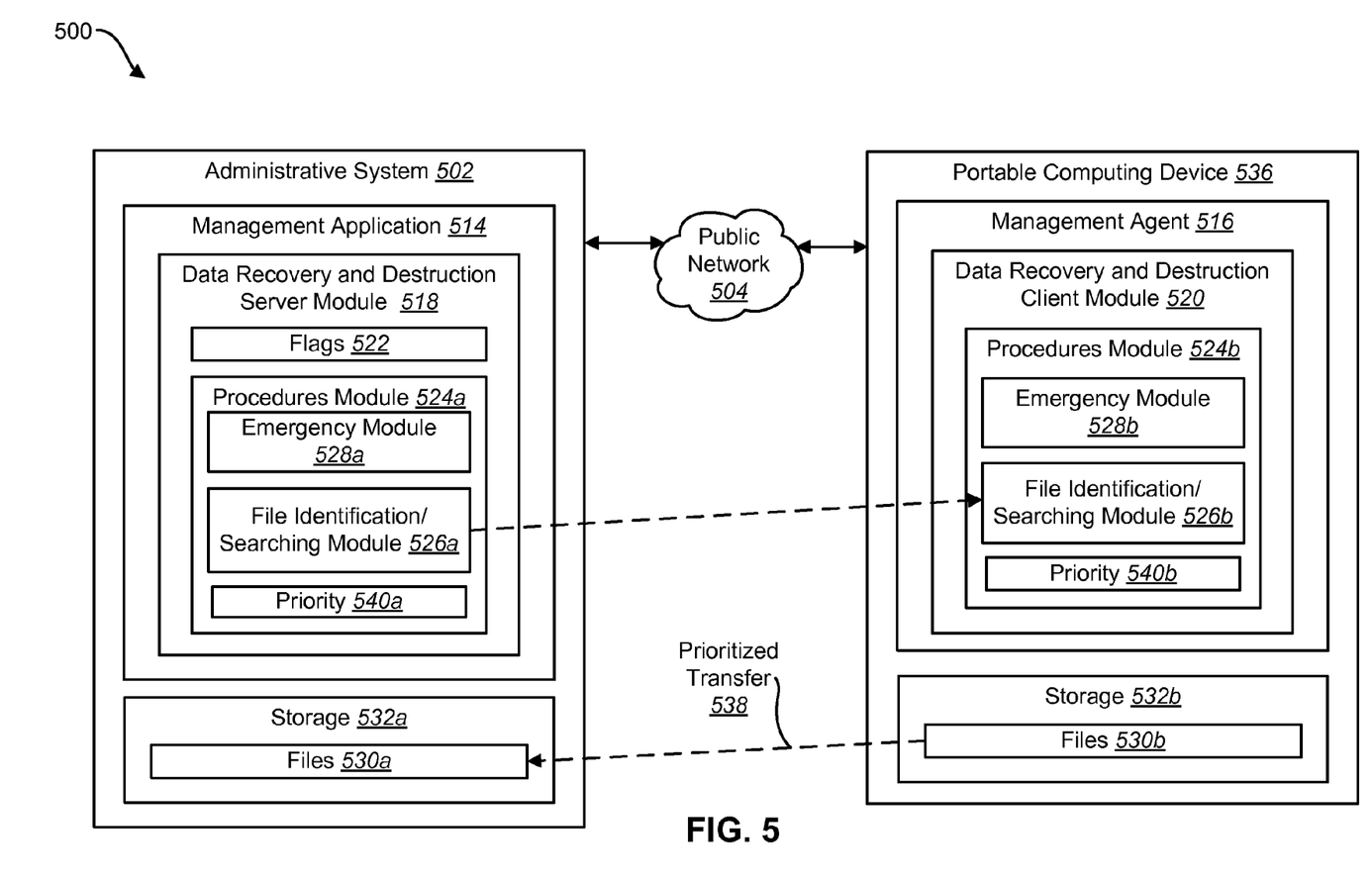
FIG. 5 is a block diagram illustrating another embodiment of a system for computer data recovery and destruction, in which prioritized file transfer is used.

FIG. 5 illustrates another embodiment of a system 500 for data recovery and destruction. Like prior embodiments 100, 200, 300, 400, a management application 514 with a data recovery and destruction server module 518 is utilized. The system 500 also includes a portable computing device 536, which may be a managed node 406, with a data recovery and destruction client module 520. The server and client modules 518, 520, each of which may include an emergency module 528a-b and file identification/searching module 526a-b, manage the recovery and destruction the files and folders.

Unlike previously disclosed embodiments, this embodiment utilizes a prioritized transfer 538 of files from electronic storage 532b on the portable computing device 536 to electronic storage 532a on the administrative system 502. Prioritized transfer 538 of the files utilizes a priority module 540a-b to determine, either by user input or by automated procedures, the order in which files and folders are to be transferred to the administrative system 502. Those of a higher priority are, of course, transferred first. As an example, Adobe® Acrobat files (with the extension .pdf) on the managed node 406 could comprise signed documents that are confidential. Accordingly, Adobe® Acrobat files could be transferred to the administrative system 502 before other identified files are transferred. There may also be multiple tiers of prioritized files. The priority for transferring files may be established even after the portable computing device 536 has been misplaced or stolen by transferring the priority module 540a from the administrative system 502 to the portable computing device 536 via the public network 504.

Rules could be established for prioritized destruction or transfer of files based on many different criteria, such as modification date, file name, file type, or file content. The destruction and recovery procedures could also operate based on the satisfaction of multiple criteria in a single file or folder. For example, in one embodiment, all Microsoft® Word documents that contain social security numbers could be destroyed immediately upon initiation of the data recovery and destruction procedures.

While FIG. 5 explicitly refers to a portable computing device 536, the disclosed systems and methods would likewise function to recover and/or destroy data on nonportable computing devices. Nonportable computing devices include computing devices that are generally not regarded as or intended to be portable, such as desktop computer systems or servers. With respect to nonportable computing devices, the systems and methods for data recovery and destruction could become very valuable if, for example, a server with critical information is stolen.

Figure 6:
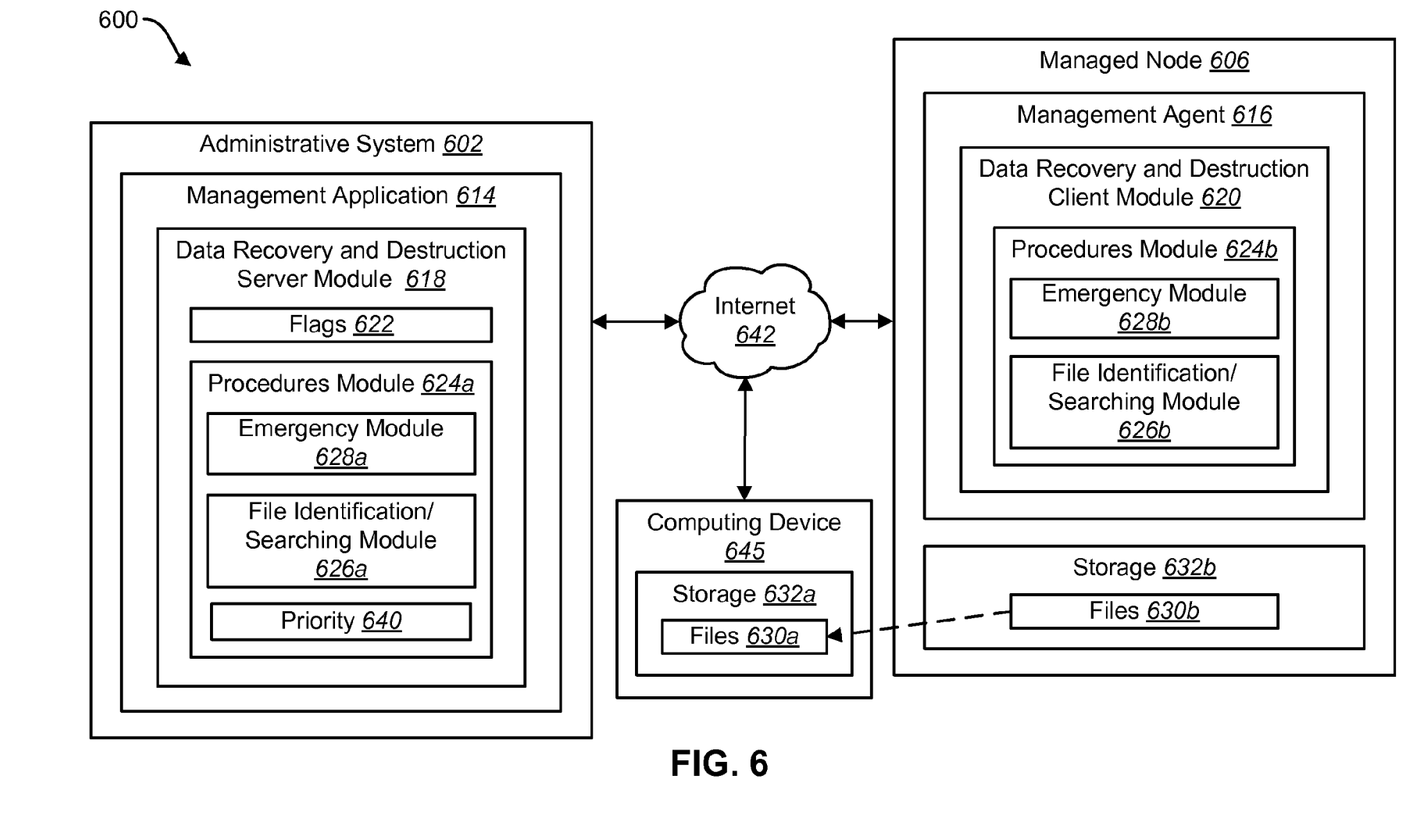
FIG. 6 is a block diagram illustrating another embodiment of a system for computer data recovery and destruction, in which recovered files are transferred to a computing device aside from an administrative system.

With reference to FIG. 6, yet another embodiment of a system 600 for recovery and destruction of files is disclosed. Once again, the administrative system 602 includes a management application 614 with a data recovery and destruction server module 618 and flags 622 indicating whether data recovery and destruction should be initiated. A managed node 606 is also disclosed having a management agent 616. As before, the management agent 616 may include a data recovery and destruction client module 620 with a procedures module 624b, a file identification/searching module 626b, and an emergency procedures module 628b.

In this embodiment, the client module 620 communicates with the server module 618 and determines when a flag 622 has been set for data recovery and destruction. In this embodiment, the client module 620 then searches for proximate computing devices 645, to which it has access. It then analyzes the connection speed and determines that a faster network connection may be established with another computing device 645 (rather than the administrative system 602). This enables faster transfer of files 630a-b from the managed node 606. As a result, the files 630a-b are transferred to an electronic storage device 632a on the computing device 645 rather than the administrative system 602, to expedite the recovery procedures.

The computing device 645 could be any device with a processor and memory. For example, the computing device 645 could be a portable computer accessible to the managed node 606 via a wireless network. The administrative system 602 or any other type of server would, of course, be a type of computing device 645. In one embodiment, the managed node 606 could transfer files 630b to multiple computing devices (e.g., the computing device 645 and the administrative node 602) simultaneously to further expedite data transfer.

Figure 7:
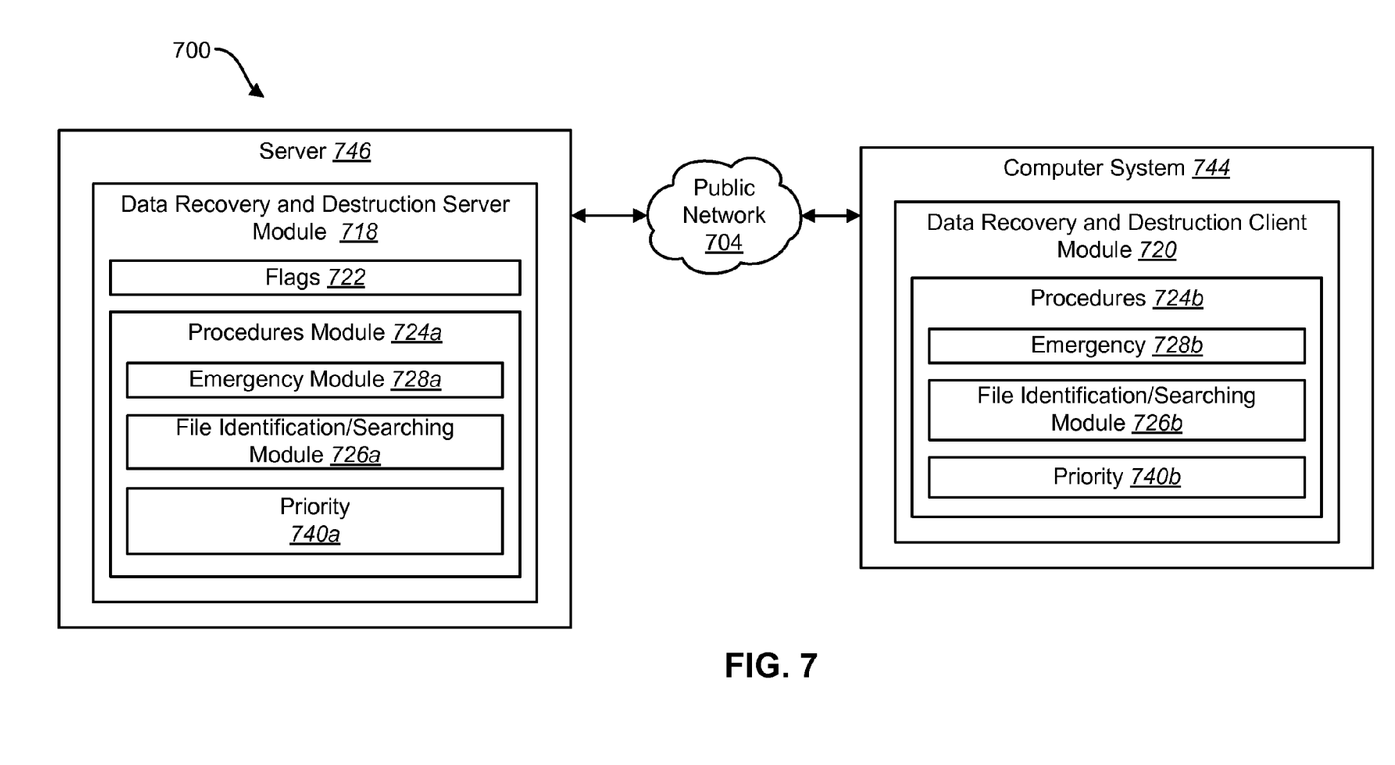
FIG. 7 is a block diagram illustrating a system of computer data recovery and destruction utilizing a server, public network, and a computer system.

With reference to FIG. 7, yet another embodiment of a system 700 of data recovery and destruction is disclosed. This embodiment includes a server 746, a public network 704, and a computer system 744. The data recovery and destruction server module 718, as indicated in FIG. 7, is an independent application that is not associated with an administrative system 602 or management application 614. The server 746 and computer system 744 are in electronic communication via a public network 704.

In this embodiment, the computer system 744 includes a data recovery and destruction client module 720, which is an independent application that is not part of a management agent 616. As with prior embodiments, the server module 718 may include flags 722.

The client and server modules 720, 718 may additionally include a procedures module 724a-b, a file identification/searching module 726a-b, and an emergency procedures module 728a-b.

These client and server modules 720, 718 work together to perform data recovery and destruction procedures. These procedures may be performed outside of a managed network, as shown in FIG. 7. In other words, the server 746 does not need to "manage" the computer system 706 in order perform the data recovery and destruction procedures in connection with the computer system 706.

Figure 8:
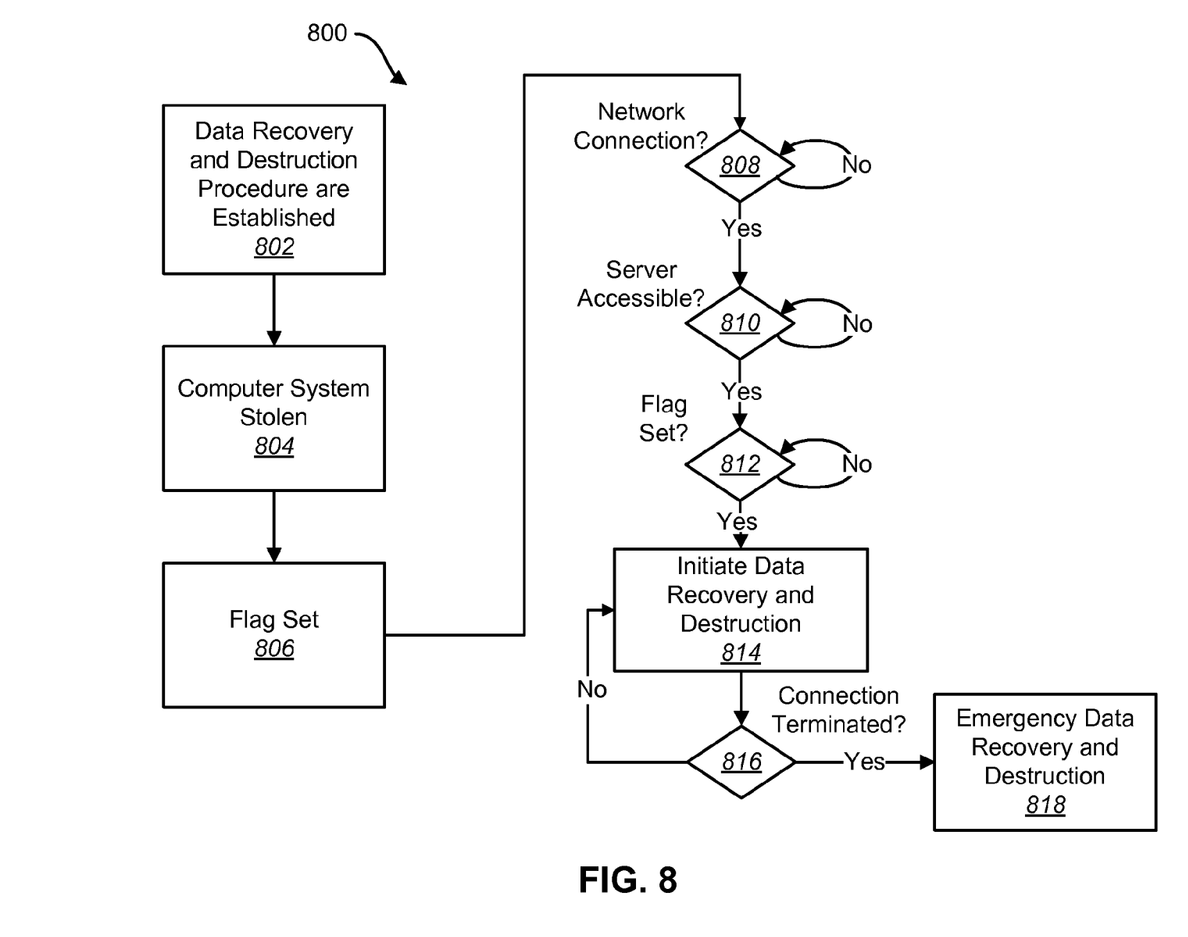
FIG. 8 is a flow diagram illustrating one embodiment of a method for computer data recovery and destruction.

With respect to FIG. 8, a flow diagram illustrating a method 800 for data recovery and destruction is disclosed. Initially, the data recovery and destruction procedures are established 802. Establishing 802 these procedures may involve, for example, receiving user input identifying the types of files to be recovered and destroyed, and then storing data corresponding to the user input. It may also include indicating which files and folders are to be recovered, destroyed, or both, and the priority for recovery and destruction of these files. This may also involve installing software on a server and/or a computer system to manage the recovery and destruction procedures, such as a management application 614, management agent 616, data recovery and destruction server module (discrete application) 718, or data recovery and destruction client module (discrete application) 720.

Thereafter, the computer system 744 (such as a managed node 606), is stolen 804, or otherwise misplaced, and a flag 722 is set 806 for data recovery and destruction. The computer system 744 then determines 808 whether a network connection has been established by the computer system 744. Once it is determined 808 that a network connection has been established, the computer system then determines 810 whether the specified server (e.g., an administrative system 602 or another server 746) is accessible.

Once communication with the specified server is established, the computer system 744 determines 812 whether a flag 722 has been set 806 for recovery and destruction of data. If a flag 722 has been set, data recovery and destruction is initiated 814. The data recovery and destruction procedure may involve transferring, including prioritized transferring 538, of files 630a from the computer system 744 to one or more computing devices 645, such as an administrative system 602 or another server 746.

Further, these procedures may also involve the destruction of data on the computer system 706. Destruction of the data on the computer system 706 may involve scrambling the destroyed data in an arbitrary way such that the data cannot be recovered, or at least cannot be easily recovered. Files to be recovered or destroyed may be identified during the recovery and destruction procedure or may comprise a static list of files identified beforehand.

If the connection is terminated 816 during the data recovery and destruction procedure, emergency data recovery and destruction procedures 818 are followed. Once again these procedures 818 may be stored on the computer system 744 or may be retrieved from the server 602, 746. Emergency procedures 818 could involve the immediate destruction of all data on the computer system 744, specified files, or destroying data which has been recovered. Because the emergency procedures 818 may be stored on the computer system 744, the emergency procedures 818 may continue even if electronic communication with the specified server 602, 746 has been terminated.

Figure 9:
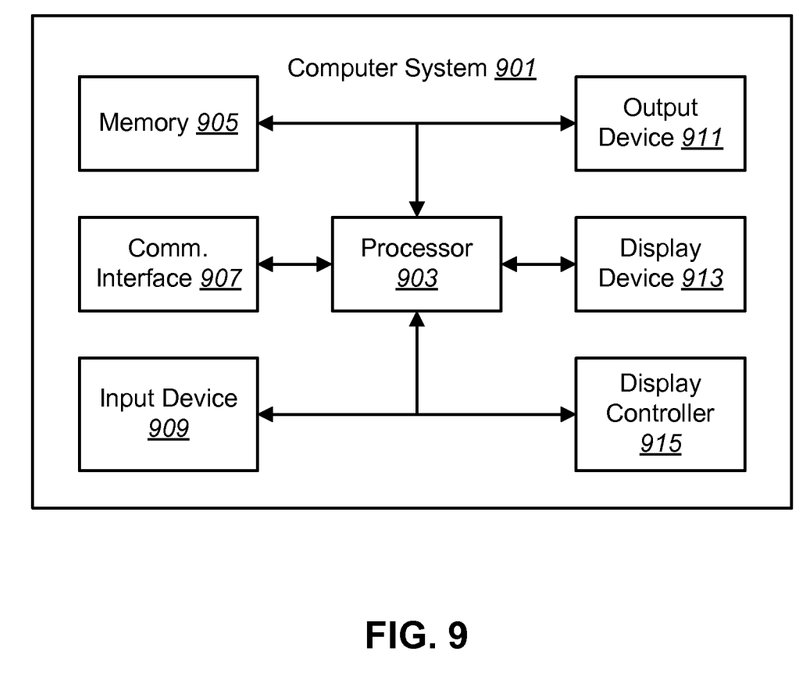
FIG. 9 illustrates various components that may be utilized in a computer system.

FIG. 9 is a block diagram illustrating the major hardware components typically utilized in a computer system 901. The illustrated components may be located within the same physical structure or in separate housings or structures.

The computer system 901 includes a processor 903 and memory 905. The processor 903 controls the operation of the computer system 901 and may be embodied as a microprocessor, a microcontroller, a digital signal processor (DSP) or other device known in the art. The processor 903 typically performs logical and arithmetic operations based on program instructions stored within the memory 905.

As used herein, the term memory 905 is broadly defined as any electronic component capable of storing electronic information, and may be embodied as read only memory (ROM), random access memory (RAM), magnetic disk storage media, optical storage media, flash memory devices in RAM, on-board memory included with the processor 903, EPROM memory, EEPROM memory, registers, etc. The memory 905 typically stores program instructions and other types of data. The program instructions may be executed by the processor 903 to implement some or all of the methods disclosed herein.

The computer system 901 typically also includes one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 901 typically also includes one or more input devices 909 and one or more output devices 911. Examples of different kinds of input devices 909 include a keyboard, mouse, microphone, remote control device, button, joystick, trackball, touchpad, lightpen, etc. Examples of different kinds of output devices 911 include a speaker, printer, etc. One specific type of output device which is typically included in a computer system is a display device 913. Display devices 913 used with embodiments disclosed herein may utilize any suitable image representation technology, such as a cathode ray tube (CRT), liquid crystal display (LCD), light-emitting diode (LED), gas plasma, electroluminescence, or the like. A display controller 915 may also be provided, for converting data stored in the memory 905 into text, graphics, and/or moving images (as appropriate) shown on the display device 913.

Of course, FIG. 9 illustrates only one possible configuration of a computer system 901. Various other architectures and components may be utilized.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for data recovery and destruction, comprising:
   determining whether a network connection has been established by a computer system;
   if the network connection has been established, determining, by the computer system, whether a specified server is accessible via the network connection by sending a message to the specified server from the computer system;
   if the specified server is accessible, accessing the specified server to determine whether a data recovery and destruction flag has been set for the computer system; and
   if the flag has been set, initiating a data recovery and destruction procedure by which data is transferred from the computer system to at least one other computing device and then at least a portion of the transferred data on the computer system is destroyed, wherein the data recovery and destruction procedure was pre-stored on the computer system such that the data recovery and destruction procedure was on the computer system before the specified server was accessed to determine whether the data recovery and destruction flag has been set,
   wherein an attempt to clean the hard drive or an attempt to remove the module that executes the data recovery and destruction procedure causes an immediate destruction of the data on the computer system,
   wherein the specified server is an administrative system for the computer system, wherein the administrative system runs a management application that performs the data recovery and destruction procedure and at least one other management task with respect to the computer system, wherein files to be deleted or recovered are identified by searching the computer system during the data recovery and destruction procedure.

2. The method of claim 1, wherein the at least one other computing device is the specified server.

3. The method of claim 1, wherein emergency data recovery and destruction procedures are implemented if electronic communication with the specified server is terminated during the data recovery and destruction procedure.

4. The method of claim 1, wherein the computer system is a portable computing device.

5. The method of claim 1, wherein the computer system is a nonportable computing device.

6. The method of claim 5, wherein the nonportable computing device comprises a desktop computer system.

7. The method of claim 3, wherein the data recovery and destruction procedure on the computer system defines that destruction of the data on the computer system will occur if recovery of the data has not been completed within a specified time frame.

8. A computer system for data recovery and destruction, comprising:
   a processor;
   memory in electronic communication with the processor; and
   instructions stored in the memory, the instructions being executable to: determine whether a network connection has been established by the computer system;
   if the network connection has been established, determine whether a specified server is accessible via the network connection, wherein the determining occurs by sending a message to the server from the computer system;

if the specified server is accessible, access the specified server to determine whether a data recovery and destruction flag has been set for the computer system on the server; and if the flag has been set, initiate a data recovery and destruction procedure by which data is transferred from the computer system to at least one other computing device and then at least a portion of the transferred data on the computer system is destroyed, wherein the data recovery and destruction procedure was pre-stored on the computer system such that the data recovery and destruction procedure was on the computer system before the specified server was accessed to determine whether the data recovery and destruction flag has been set, wherein an attempt to clean the hard drive or an attempt to remove the module that executes the data recovery and destruction procedure causes an immediate destruction of the data on the computer system, wherein the specified server is an administrative system for the computer system, wherein the administrative system runs a management application that performs the data recovery and destruction procedure and at least one other management task with respect to the computer system, wherein files to be deleted or recovered are identified by searching the computer system during the data recovery and destruction procedure.

9. A non-transitory computer-readable medium comprising instructions for data recovery and destruction, the instructions being executable to:

determine whether a network connection has been established by a computer system;

if the network connection has been established, determine, by the computer system, whether a specified server is accessible via the network connection, wherein the determining occurs by sending a message to the specified server from the computer system;

if the specified server is accessible, access the specified server to determine whether a data recovery and destruction flag has been set for the computer system on the server; and if the flag has been set, initiate a data recovery and destruction procedure by which data is transferred from the computer system to at least one other computing device and then at least a portion of the transferred data on the computer system is destroyed, wherein the data recovery and destruction procedure was pre-stored on the computer system such that the data recovery and destruction procedure was on the computer system before the specified server was accessed to determine whether the data recovery and destruction flag has been set, wherein an attempt to clean the hard drive or an attempt to remove the module that executes the data recovery and destruction procedure causes an immediate destruction of the data on the computer system, wherein the specified server is an administrative system for the computer system, wherein the administrative system runs a management application that performs the data recovery and destruction procedure and at least one other management task with respect to the computer system, wherein files to be deleted or recovered are identified by searching the computer system during the data recovery and destruction procedure.

* * * * *

UNITED STATES PATENT AND TRADEMARK OFFICE
CERTIFICATE OF CORRECTION

| | |
|---|---|
| PATENT NO. | : 8,959,182 B1 |
| APPLICATION NO. | : 12/103437 |
| DATED | : February 17, 2015 |
| INVENTOR(S) | : Devin D. Anderson et al. |

Page 1 of 1

It is certified that error appears in the above-identified patent and that said Letters Patent is hereby corrected as shown below:

In the Specification

In column 6, line 45 please delete "managed node 306," and replace it with --managed node 306),--.

Signed and Sealed this
Eighth Day of September, 2015

Michelle K. Lee
*Director of the United States Patent and Trademark Office*